United States Patent [19]

Cooper et al.

[11] Patent Number: 4,618,795
[45] Date of Patent: Oct. 21, 1986

[54] TURBINE GENERATOR STATOR END WINDING SUPPORT ASSEMBLY WITH DECOUPLING FROM THE CORE

[75] Inventors: Glenn D. Cooper; John M. Butler, III; Darrell R. Morrison, all of Orlando; Charles L. Senic; Lennart S. Nilsson, both of Winter Park; Charles M. Rowe, Orlando, all of Fla.

[73] Assignee: Westinghouse Electric Corp., Pittsburgh, Pa.

[21] Appl. No.: 721,618

[22] Filed: Apr. 10, 1985

[51] Int. Cl.⁴ .............................................. H02K 3/46
[52] U.S. Cl. ...................................... 310/260; 310/42; 310/43; 310/45
[58] Field of Search ................. 310/260, 270, 271, 42, 310/43, 45; 336/197

[56] References Cited

U.S. PATENT DOCUMENTS

| | | | |
|---|---|---|---|
| 3,866,073 | 2/1975 | Gjaja | 310/260 |
| 3,949,257 | 4/1976 | Cooper | 310/260 |
| 3,988,625 | 10/1976 | Jager | 310/260 |
| 4,126,799 | 11/1978 | Iogansen | 310/260 |
| 4,379,243 | 4/1983 | Dailey | 310/260 |
| 4,488,079 | 12/1984 | Dailey | 310/260 |

FOREIGN PATENT DOCUMENTS

| | | | |
|---|---|---|---|
| 0943606 | 3/1974 | Canada | 310/260 |
| 1197971 | 4/1963 | Fed. Rep. of Germany | 310/260 |
| 2231292 | 1/1974 | Fed. Rep. of Germany | 310/260 |
| 2606484 | 8/1977 | Fed. Rep. of Germany | 310/260 |
| 0413073 | 5/1966 | Switzerland | 310/260 |
| 1539707 | 1/1979 | United Kingdom | 310/260 |

Primary Examiner—R. Skudy
Attorney, Agent, or Firm—G. H. Telfer

[57] ABSTRACT

A structure for consolidating large turbine generator end turns while providing for thermal compensation includes a decoupled brace that is located radially outside the end turns and has a bottom piece secured to a bracket secured to the core as well as a top piece adjacent the coil and an intermediate decoupler between the two that includes elastomeric material for cushioning as well as a slip layer for allowing free axial movement between the top and bottom pieces of the brace. Additionally, keyed strain blocks may be utilized between top and bottom coils of the assembly for greater consolidation.

5 Claims, 4 Drawing Figures

TURBINE GENERATOR STATOR END WINDING SUPPORT ASSEMBLY WITH DECOUPLING FROM THE CORE

BACKGROUND AND SUMMARY OF THE INVENTION

This invention relates generally to dynamoelectric machines and more particularly to end winding support assemblies of large turbine generators.

During operation of large, hydrogen-inner-cooled generators the temperature of the machine will increase, causing thermal expansion of the various components in the generator end winding assembly. Unless the end winding is totally balanced thermally, or thermal compensation is built into the design, there will be thermal stresses increasing the risk of failure of various components.

The need for allowing for thermal expansion while maintaining the integrity of the end winding assembly has been long recognized. Arrangements to fill that need have been more or less successful but have generally left a continuing desire for alternative arrangements and methods of assembly that are both effective and inexpensive to practice. A further desirable quality is the ability to retrofit an improved thermal compensation support assembly in the end windings of an existing machine in the field. The present invention addresses these concerns in providing a new end turn assembly and method of construction that is very effective and easily applicable to new machine construction. A significant element of the new assembly can also be installed in an existing machine in the field without requiring removal of the coils.

By the present invention, two significant features are incorporated in the end winding assembly for new or rewound machines. One feature to consolidate the end winding is the use of keyed strain blocks mounted between top and bottom coils at several locations. The strain blocks are shaped to fit tightly between the coils. They support the top coils and transfer electromagnetic forces from the top coils to the coil support bracket that is affixed to the stator core.

During operation, the top and bottom coils expand due to the thermal expansion. Some of the expansion takes place in the axial direction of the coil involute creating a torque on the strain block that may overstress the bond between the strain blocks and the coils, as strain blocks have been previously used. Former designs on which the present invention improves utilize strain blocks mounted flush to a middle coil support ring with merely a single abutting surface. By the present invention, the strain blocks are keyed or interlocked with the support ring. By keying the strain block to the thermally matched middle coil support ring, the force created by the torque can partly be taken up by the strain block and the stress between the strain block and the coil will decrease since only shear stress and no tensile stress will occur in the bond. The keyed strain block is also preferably long enough in the axial direction to overlap four to six top and bottom coils for further reduction of the shear stresses. By referring to the strain blocks as "keyed" is meant that they are physically fit within notches in the coil support ring which is preferable to using pins or other types of fasteners that increase assembly time.

The other principal feature of the invention, and one which can be applied to machines in the field without requiring rewinding, as well as in new manufacture, is a new form of brace. During operation of the generator, the stator coils expand axially out of the core creating high stresses between the bottom coils and the coil support brace utilized as an intermediate element between the coils and the bracket joined to the core. By the present invention, the brace comprises a plurality of rigid pieces including at least a top and a bottom piece between which is an intermediate decoupler that includes a layer of material such as rubber for cushioning between the elements and an antifriction layer such as polytetrafluoroethylene for low friction. The system will allow for free expansion in the axial direction because of the low friction layer. This eliminates thermal stress and prevents failure of the bond between coils and braces thereby eliminating wear of the coil at this interface. The brace will continue to function as a stop to prevent excessive coil deflection during short circuits. The rubber layer will allow for resilient absorption during an impact in the radial direction. The top piece is bonded to the bottom coil such as by using epoxy-impregnated Dacron fabric material for conformability. This will allow for various coil shapes. The top piece of the brace is also attached to the bottom coil support ring to increase the integrity of the system. The top piece also serves as extra protection for the bottom coil insulation.

Besides allowing for thermal expansion, this brace design will dynamically uncouple the end winding from the core minimizing the core influence on the end winding vibration. Any relative motion, either thermal or vibratory, must occur at the low friction interface, rather than at the coil insulation surface.

DESCRIPTION OF THE PREFERRED EMBODIMENTS

Figure 1:
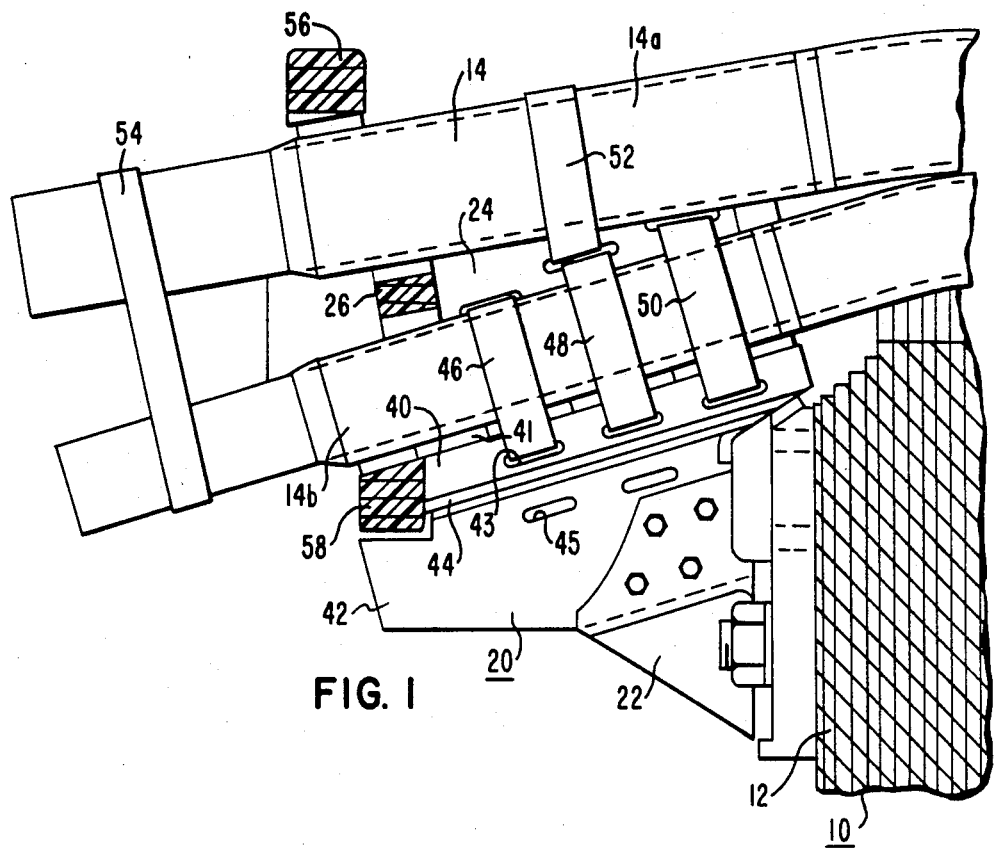
FIG. 1 is a partial cross-sectional side view of a turbine generator in accordance with an embodiment of the present invention.

Referring to FIG. 1, part of a dynamoelectric machine is shown that includes a stator 10 with a core 12 and a stator winding 14. A rotor (not shown) is provided on a shaft for rotation within a generally cylindrical bore of the stator 10. In the view of FIG. 1, the rotor would be located upward of the portion of the stator core 12 that is illustrated and the rotor shaft axis would be a horizontal line. The stator winding 14 is represented by the end portions of two coil halves that include other portions within slots in the core 12. The end winding portion 14 extends axially from each end face of the core 12. The stator winding 14 has, for example, gas inner-cooled conductors and the machine is representative of a turbine generator. The winding 14 may alternatively be a water-cooled winding. For simplicity of the drawing, vent tubes or other coolant passages are not specifically illustrated.

A support assembly is provided for the end winding portion of the stator winding 14 and includes means for restraining the end winding portion against excessive motion in the radial direction relative to the shaft axis while allowing the axial motion. The means for restraining includes a brace 20 and a bracket 22, individual ones of which are located radially outside the end turn portion 14 at a number of locations, such as about eighteen to about thirty two, at each end of the machine. The end winding 14 is made up of a number of top coils 14a and a number of bottom coils 14b.

The bracket 22 is fixedly secured to the core 12 end face and also to the brace 20 which runs in a substantially radial plane from the machine axis in support of the coil end turns 14. Also shown is a tapered strain block 24 extending in a tight relationship between top and bottom coils 14a and 14b. Such a strain block 24 is used at various locations and each is keyed to a middle support ring 26 at its axial extremity.

Figure 2:
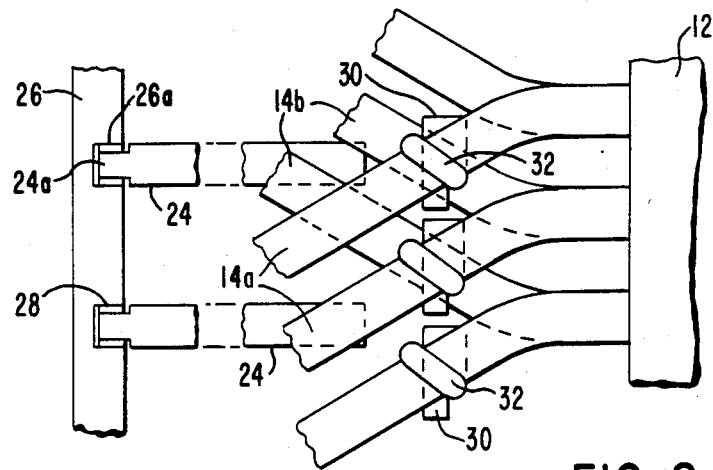
FIG. 2 is a partial plan view of an end winding assembly in accordance with the invention; and, FIGS. 3 and 4 are partial cross-sectional views of an end winding assembly in accordance with embodiments of this invention showing particular forms which the decoupled brace may take.

FIG. 2 shows a partial plan view of the end turn region to give a better idea of the location of the strain blocks 24. Representative ones of the top coils 14a and the bottom coils 14b are shown extending from the core 12. The top coils 14a bend in one direction circumferentially while the bottom coils 14b bend in the opposite circumferential direction. The strain blocks 24 extend substantially axially between a number (approximately four to six in practice) of top and bottom coils 14a and 14b. At least the outer end of each strain block 24 is keyed into support ring 26 which has notches 26a for that purpose accommodating a reduced size end 24a of the strain block and one or more layers of conformably setting material 28 such as epoxy resin impregnated Dacron felt material. It will be apparent that other configurations may be utilized for securing the strain blocks 24 to the support ring 26.

Also shown in FIG. 2 is the use of filler members 30 between the top and bottom coils 14a and 14b at the crossovers of a top coil and a bottom coil from an adjacent slot. The filler members 30 are joined by banding 32 to the top coils 14a.

The brace 20, referring again to FIG. 1, comprises a top rigid piece 40 adjacent the bottom coil 14b and a bottom rigid piece 42, radially outside the top piece, secured to the bracket 22. The top and bottom rigid pieces 40 and 42 may, for example, be of a glass fiber reinforced composite material. A conformable layer 41 is located between the top piece 40 and the coil 14b and may, for example, consist of epoxy impregnated Dacron material.

Between the top and bottom rigid pieces 40 and 42 of the brace is an intermediate decoupler 44 which may take various forms to be described hereinafter with reference to FIGS. 3 and 4. It generally consists of one or more layers of material which together provide cushioning between the top and bottom pieces 40 and 42 and low friction between those pieces for allowing relative movement in an axial direction.

Additionally, various bandings are illustrated in FIG. 1. Banding 46 secures the top piece 40 of the brace 20 and the bottom coil 14b. Banding 48 and 50 similarly hold the top piece 40 and coil 14b together but banding 48 passes through an aperture in strain block 24 and banding 50 passes over the top of the strain block 24. The bandings 46, 48 and 50 each pass through an aperture 43 in the brace top piece 40. These are just examples of how banding further consolidates the end turn assembly. Additionally as shown in FIG. 1, there is banding 52 that encompasses the intermediate portion of the strain block 24 through the aperture and the top coil 14a and banding 54 around end portions of top coil 14a and bottom coil 14b. The banding elements 46 through 54 may be epoxy resin impregnated fabric.

There are also various support rings 56 and 58 that extend around the entire assembly as has been used heretofore in end winding assemblies. Of these, bottom ring 58 is directly joined, such as by dowels or any other suitable manner, to the outer end of brace top piece 40. The result is a physically united assembly of coils 14a and 14b with brace top piece 40 that is free to move axially due to thermal effects and with the brace bottom piece 42 and bracket 22 keeping radial movement to a minimum.

It is also been in FIG. 1 that, in this embodiment, there are apertures 45 in the brace bottom piece 42 that are not shown with any banding. In initial assembly, a temporary tie is made between brace pieces 40 and 42 using apertures 43 and 45. When the resinous materials (e.g. in the various banding elements and conformable layers) have been cured, the temporary ties are removed resulting in the structure as illustrated.

Figure 3:
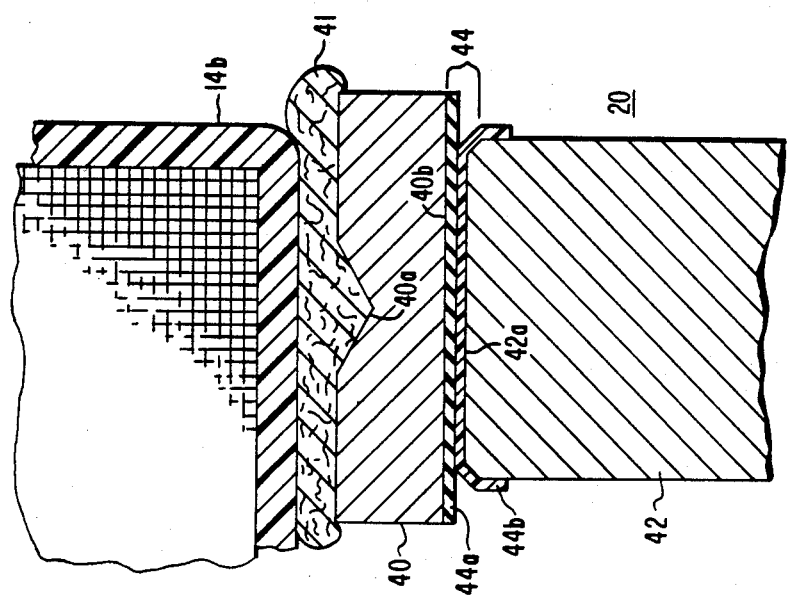

Referring to FIG. 3, a brace 20 is shown including a bottom piece 42 that is generally a plate-like member having major surfaces disposed in a radial plane with an upper surface 42a disposed transverse to that plane. The bottom piece 42, as shown in FIG. 1, extends axially over a substantial portion of the end portion of the winding. The brace top piece 40 is a generally plate-like member having its major surfaces disposed parallel to the upper surface 42a of the bottom piece 42. In the embodiment shown in FIG. 3, the upper surface of the brace top piece 40 is configured with a V-notch 40a for retention of a Dacron felt-impregnated layer 41 that provides a conformable or form fitting layer adjacent the underside of a coil 14b. Other configured notches or grooves may be used for this purpose; often none are required, as in FIG. 4.

The intermediate decoupler 44 of FIG. 3 includes an elastomer layer 44a, such as one of Nitrile rubber, between the bottom major surface of the top piece 40 and the upper surface 42a of the bottom piece. In particular, the rubber layer 44a may be bonded to the bottom surface 40b of the top piece 40. Also, the intermediate decoupler 44 includes a slip layer 44b comprising a low friction material such as polytetrafluoroethylene (PTFE) on the side of elastomer layer 44a immediately adjacent the upper surface 42a of the bottom piece 42. Slip layer 44b may, for example, consist of a cotton fabric coated with PTFE.

Figure 4:
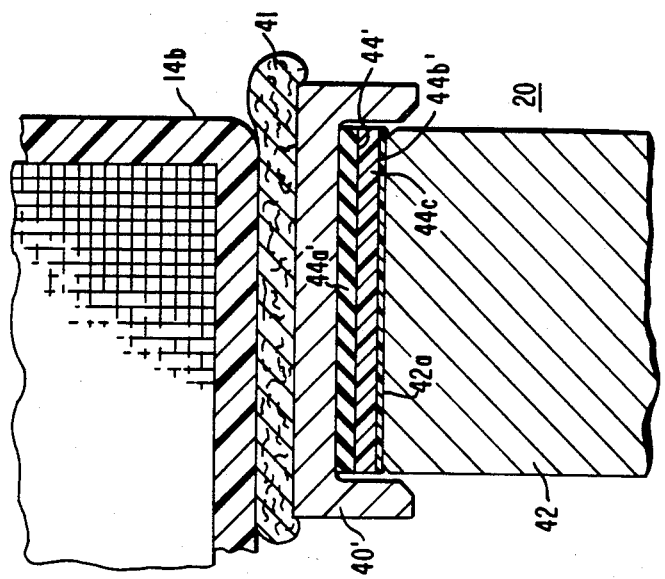

A further alternative is shown in FIG. 4. Here, the brace top piece 40' is in the form of a channel-type element that, in addition to the major surfaces that are parallel with the top surface 42a of the bottom piece 42, includes radial extensions that tend to confine the intermediate decoupler 44'. Here, the decoupler includes a rubber layer 44a' such as one of Viton rubber, adjacent a rigid composite strip 44c such as one of Micarta composite material, which has on its lower surface a PTFE slip layer 44b' for allowing movement in relation to the bottom piece 42.

It will be apparent from the above description that the decoupled brace can be variously configured in other forms; for example, it may include additional floating pieces such as the piece 44c and additional cushioning layers such as layer 44a'. Also, such a third or floating piece, as shown by the Micarta strip 44c of FIG. 4, could be other than strictly planar and rigid. It could be a thin but rippled, spring-like piece of composite material with PTFE coating which acts as a spring element taking up slack in the structure as well as a radial damper upon short circuiting.

In the various forms in which the decoupled brace may be used, it may be assembled readily by fastening the bottom piece 42 to the bracket 22 and inserting the top piece 40 to which the decoupler is bonded into the end turn region utilizing the conformability of the conformable layer 41 to provide minimal resistance. After the epoxy impregnated felt 41 sets, there is a secure relation between the parts except for the desired quality of axial movement due to thermal effects.

A key advantage to the use of the decoupled brace 20 of this invention is that it may readily be retrofitted into an existing machine without requiring rewinding and thus contributes to extending the life of the machine.

We claim:

1. A dynamoelectric machine comprising:
a stator with a core and a stator winding, said core having a generally cylindrical bore;
said stator winding including inner portions within slots in said core and end portions extending axially from each end of said core;
a support assembly for restraining said end portions of said stator winding, said support assembly comprising a brace and a bracket located at each of a plurality of spaced positions radially outside said end portions;
said bracket being fixedly secured to said core and to said brace;
said brace comprising a top rigid piece adjacent said end portions of said winding, a bottom rigid piece, radially outside said top piece, secured to said bracket, and an intermediate decoupler between said top and bottom pieces, said intermediate decoupler comprising an elastomer layer and a slip layer which together provide cushioning between said top and bottom pieces and low friction between said top and bottom pieces for permitting relative movement in an axial direction;
said brace bottom piece being a generally plate-like member having its major surfaces disposed in a radial plane with an upper surface disposed transverse to said radial plane, said bottom piece extending axially over a substantial portion of said end portion of said winding;
said brace top piece being a generally plate-like member having a lower major surface disposed parallel to said upper surface of said bottom piece; and,
said elastomer layer and said slip layer are disposed between and parallel with said upper surface of said brace bottom piece and said lower major surface of said brace top piece.

2. A dynamoelectric machine in accordance with claim 1 wherein:
said top piece bears against said winding with a form fitting layer of cured resin-impregnated fabric therebetween.

3. A dynamoelectric machine in accordance with claim 1 wherein:
said decoupler further includes a strip of relatively rigid material on the radial outside of said elastomer layer, and said slip layer is on said strip of relatively rigid material adjacent said bottom piece.

4. A dynamoelectric machine in accordance with claim 1 wherein:
said support assembly further comprises a strain block axially extending between top coils and bottom coils of said stator winding end portions at each of a plurality of locations and a middle support ring that runs circumferentially between said top coils and bottom coils, said support ring being immediately adjacent the axially outer ends of said strain blocks and having a tightly secured interfitting relation therebetween.

5. A dynamoelectric machine in accordance with claim 4 wherein:
said strain block is further secured by radial bandings to said bottom coils and to said brace top piece.

* * * * *